(12) United States Patent
Frank et al.

(10) Patent No.: US 7,240,157 B2
(45) Date of Patent: Jul. 3, 2007

(54) SYSTEM FOR HANDLING MEMORY REQUESTS AND METHOD THEREOF

(75) Inventors: Michael Frank, Sunnyvale, CA (US); Santiago Fernandez-Gomez, Menlo Park, CA (US); Robert W. Laker, Fremont, CA (US); Aki Niimura, Sunnyvale, CA (US)

(73) Assignee: ATI Technologies, Inc., Toronto, Ontario (CA)

( * ) Notice: Subject to any disclaimer, the term of this patent is extended or adjusted under 35 U.S.C. 154(b) by 696 days.

(21) Appl. No.: 09/963,861

(22) Filed: Sep. 26, 2001

(65) Prior Publication Data

US 2003/0061443 A1    Mar. 27, 2003

(51) Int. Cl.
    *G06F 12/00* (2006.01)
(52) U.S. Cl. .................. 711/118; 711/133; 711/136; 711/141; 711/160
(58) Field of Classification Search ................ 711/118, 711/141, 168; 710/5, 15
    See application file for complete search history.

(56) References Cited

U.S. PATENT DOCUMENTS

| | | | | |
|---|---|---|---|---|
| 5,325,508 A | * | 6/1994 | Parks et al. ................. | 711/118 |
| 6,052,772 A | * | 4/2000 | Kark et al. .................... | 712/38 |
| 6,202,101 B1 | * | 3/2001 | Chin et al. ..................... | 710/5 |
| 6,219,711 B1 | * | 4/2001 | Chari .......................... | 709/232 |
| 6,237,064 B1 | * | 5/2001 | Kumar et al. ................ | 711/122 |
| 6,314,472 B1 | * | 11/2001 | Trieu et al. .................... | 710/5 |
| 6,427,188 B1 | * | 7/2002 | Lyon et al. .................. | 711/122 |
| 6,446,143 B1 | * | 9/2002 | Razdan et al. ................ | 710/29 |
| 6,457,075 B1 | * | 9/2002 | Koutsoures .................. | 710/35 |
| 6,470,428 B1 | * | 10/2002 | Milway et al. ............. | 711/138 |
| 6,505,199 B1 | * | 1/2003 | Nakano et al. ................ | 707/8 |
| 6,625,707 B2 | * | 9/2003 | Bormann ..................... | 711/169 |

* cited by examiner

*Primary Examiner*—Reginald Bragdon
*Assistant Examiner*—Ngoc Dinh

(57) ABSTRACT

A system and methods are shown for handling multiple target memory requests. Memory read requests generated by a peripheral component interconnect (PCI) client are received by a PCI bus controller. The PCI bus controller passes the memory request to a memory controller used to access main memory. The memory controller passes the memory request to a bus interface unit used to access cache memory and a processor. The bus interface unit determines if cache memory can be used to provide the data associated with the PCI client's memory request. While the bus interface unit determines if cache memory may be used, the memory controller continues to process the memory request to main memory. If cache memory can be used, the bus interface unit provides the data to the PCI client and sends a notification to the memory controller. The memory controller identifies the memory request, or returned data associated with the request, and discards it to ensure no data is returned to the bus controller from the memory controller. Once the data is received from the bus interface unit, the bus controller is free to send new memory read requests to the memory controller.

8 Claims, 4 Drawing Sheets

SYSTEM FOR HANDLING MEMORY REQUESTS AND METHOD THEREOF

FIELD OF THE DISCLOSURE

The present invention relates generally to memory and more particularly to handling memory requests.

BACKGROUND

In current computer architectures, several levels of memory may be implemented. A hard drive, random access memory (RAM), and cache memory, all represent memory sources that may be used to write and read data. RAM is often used as a computer's main memory. Data consistently being accessed may be read from a hard drive and stored in RAM for faster access. However, RAM is still unable to be accessed in time to meet the high speeds of most new computer processors. While used as the main memory in a computer, RAM accessing may present latency to the computer. A single RAM device can only process a select number of memory requests at one time. Therefore, most processors within an information handling system use cache memory for handling some memory requests. Cache memory is memory local to a processor.

It is possible for a memory client to request to read data from main memory, but receive data from another memory source, such as cache memory. When dealing with memory intensive clients, such as graphics clients, main memory may introduce latencies due to other memory requests, which are pending in a memory controller for processing in main memory. To reduce these latencies encountered when accessing data from main memory, cache memory is used to provide data requested from main memory. Cache memory may store copies of data stored in main memory. However, the cache memory must maintain coherency with the main memory for the data to be valid. Cache coherency is a synchronization of data between cache memory and main memory so that a particular set of data in cache memory is the current version of that data currently stored in main memory.

In order to decrease the response time to requests for information stored in memory, some conventional systems will attempt to fill those requests using information stored in a processor's cache memory. One problem with this scheme, however, is that the data in cache memory does not always represent a current version of the data in main memory. Conventional systems deal with this problem by first determining if cache memory is coherent with main memory; if so the memory controller obtains the data from the cache memory. However, if the cache memory is not coherent with the main memory, then the memory controller fetches the data from main memory.

In the case where the cache memory is not coherent with the main memory, the memory controller must wait until after it has determined that the cache memory is current before it processes the request to fetch the data from main memory, because the memory controller stalls the current memory request and sends a signal to the processor to determine if cache memory is current. While such a method allows data to be accessed from cache memory, it also introduces latency as the memory controller stalls the request to determine the coherency of cache memory. From the above discussion, it is apparent that an improved method for accessing data within a system with multiple memory sources is needed.

BRIEF DESCRIPTION OF THE DRAWINGS

Specific embodiments of the present invention are shown and described in the drawings presented herein. Various objects, advantages, features and characteristics of the present invention, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present invention provides for a method of handling memory requests, known as multiple target memory requests, in systems with multiple memory devices. The method includes receiving a first request to access data from a first memory device. The first request includes a memory request generated by a client and processed through a bus controller. In one embodiment, the client includes a graphics client which generates many memory requests. The method also includes preparing the first request for access through a first memory device. In one embodiment, the first memory device includes main memory, such as random access memory. The method also includes providing a second request to access the data from a second memory device. In one embodiment the second memory device includes cache memory, such as a microprocessor cache, associated with main memory. The method further includes receiving a first notification that the data associated with the first request is available from the second memory device and terminating the first request, in response to the first notification, at a particular location. The particular location is dependent on how quickly the first notification is received after receiving the first request. If the first notification is received before the first request is sent to the first memory device, the first request is terminated. If the first notification is received after the first request is queued, the data received from the first memory device, in response to the first request, is terminated.

Figure 1:
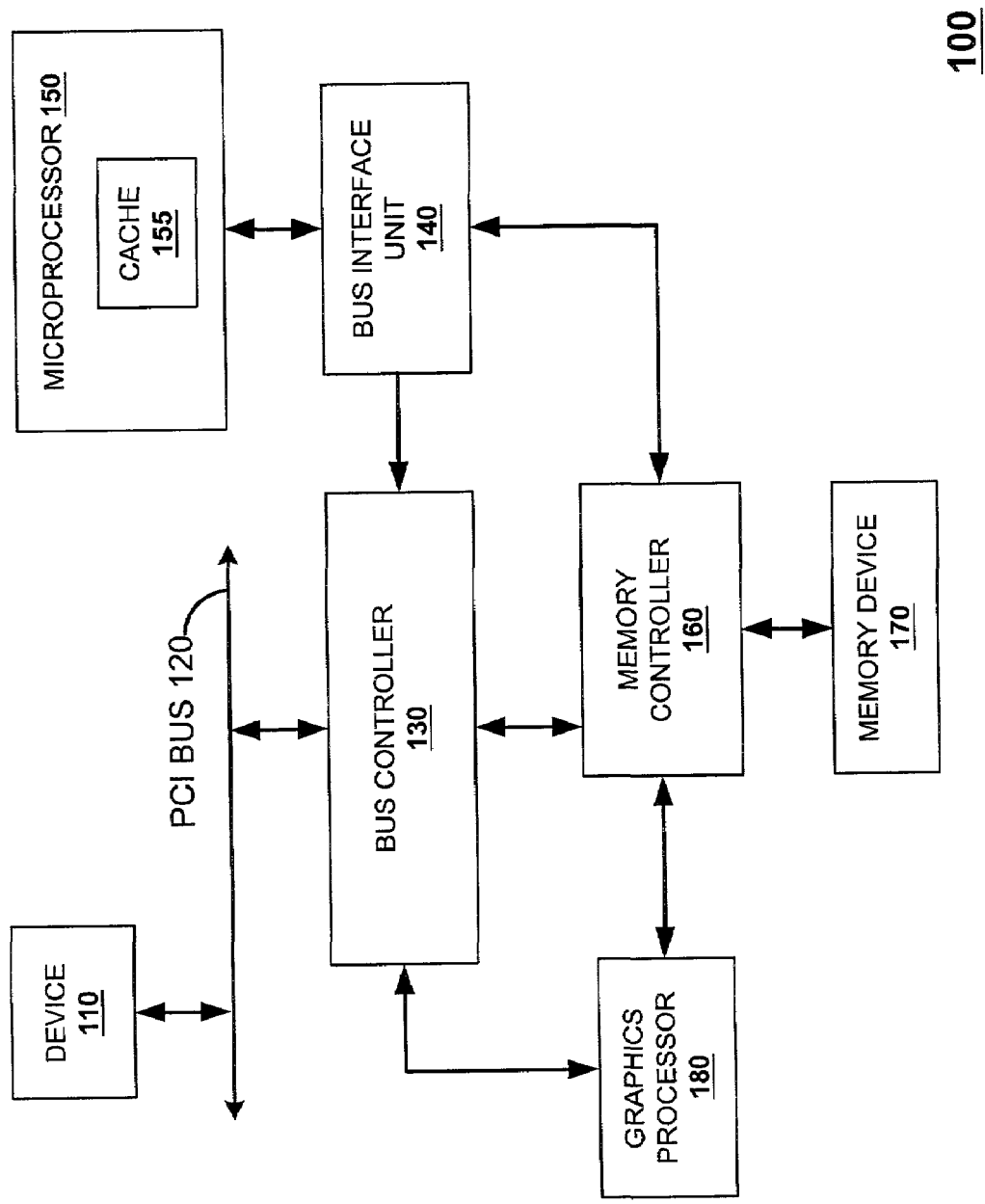
FIG. 1 is a block diagram illustrating a system for processing memory requests, according to one embodiment of the present invention.

Referring now to FIG. 1, a block diagram illustrating a system for processing memory requests is shown and generally referred to as system 100, according to one embodiment of the present invention. System 100 processes requests from various clients, such as device 110. Clients may include software clients, such as graphics applications, which must access memory device 170 for data. Clients may also include hardware clients, such as graphics processor 180, accessing memory device 170 for data. A bus client, such as device 110, generates a request for data to be read from a memory, such as memory device 170. Bus controller 130 receives the request from device 110 and sends the request to memory controller 160. Memory controller 160 begins to process the request and provides a copy of the request to cache memory 155, through bus interface unit 140. If cache memory 155 has a current copy of the data, memory controller 160 terminates the request it is processing and bus interface unit 140 sends the data from cache memory 155 to device 110, through bus controller 130. If cache memory 155 does not have a current copy, memory controller 160 continues to process the request.

System 100 is an information handling system that provides processing for various clients, such as device 110. A microprocessor 150 provides control and performs processes governed by components of system 100, such as device 110, bus controller 130, bus interface unit 140, and memory controller 160. Microprocessor 150 also includes local memory, such as cache memory 155. In one embodiment, microprocessor 150 represents a general-purpose system processor, such as a central processing unit (CPU), of system 100. Microprocessor 150 may also include an application specific integrated circuit (ASIC). In one embodiment, microprocessor 150 includes a graphics processing ASIC, such as graphics processor 180. Device 110 may include software or hardware clients used to handle specific processes. For example, in one embodiment, device 110 is a graphics client used to process video graphics commands for system 100. Device 110 places the memory requests on a system bus, such as peripheral component interconnect (PCI) bus 120. It should be noted that other buses may also be used, such as an industries standard architecture (ISA) bus, or an extended ISA (EISA) bus. The commands may include a memory address from which to read data as well as the amount of data requested. Bus controller 130 receives the memory request and provides the request to memory controller 160. In one embodiment, bus controller 130 processes the memory request by addressing the memory request to memory controller 160. In one embodiment, bus controller 130 addresses a particular port of memory controller 160 where memory controller 160 will receive and process the memory request. Memory device 170 may include system memory, such as random access memory (RAM), of system 100. Memory device 170 may also include video memory, such as a frame buffer, used for video and graphics processing.

In one embodiment, graphics processor 180 generates requests for access of memory device 170, through memory controller 160. Graphics processor 180 receives processing requests through an accelerated graphics port (AGP) 125. Graphics processor 180 generates requests to write to and read from memory device 170. In one embodiment, graphics processor 180 is integrated into system 100 and includes a direct connection to a port of memory controller 160. Memory controller 160 receives memory requests directly from graphics processor 180 and processes them along with memory requests from other memory clients, such as device 110, received through bus controller 130. Alternatively, graphics processor 180 may not be integrated directly with memory controller 160 and memory controller 160 may receive memory requests from graphics processor 180 through bus controller 130.

In one embodiment, device 110 is a memory intensive client, generating a high volume of memory requests. A maximum number of requests, which may be processed by memory controller 160 at a time, determines a maximum bandwidth of requests that may be provided by memory controller 160. In one embodiment, to reduce the number of requests being processed by memory controller 160, cache memory 155 handles the requests. However, it is not always known if cache memory 155 contains a current version of data stored in memory device 170. Memory controller 160 begins to process the received request from bus controller 130 and sends a copy of the request for processing by cache memory 155, through bus interface unit 140. Memory requests that are capable of being processed using both memory device 170 and cache memory 155 are known as multiple target memory requests.

Bus interface unit 140 provides access between a processor, such as microprocessor 150, and other components of system 100, such as bus controller 130 and memory controller 160. Bus interface unit 140 also provides access to cache memory 155. Bus interface unit 140 receives memory requests from memory controller 160. Before providing data in cache memory 155, bus interface unit 140 determines if cache memory 155 is coherent, indicating the data being requested by the memory requests are current with memory device 170. Several methods exist for determining the coherency of cache memory 155 with memory device 170. In one embodiment, it is determined whether any processor other than microprocessor 150, such as graphics processor 180, or components of system 100 have written to memory device 170 since the last time cache memory 155 was synchronized with memory device 170. If other components have written to memory device 170 during that time, cache memory 155 is not considered coherent and must first be synchronized with memory device 170 before providing data. Memory synchronization is a process of copying at least a portion of the data in memory device 170 to cache memory 155. It should be appreciated that other methods of determining cache memory coherency may be used without departing from the scope of the present invention.

Determining the coherency of cache memory 155 and synchronizing cache memory 155 may take some time. In conventional systems, a memory controller coupled to a memory device waits until the coherency is determined before processing the request to main memory. To reduce latency, memory controller 160 of system 100 continues to process the memory request while coherency is determined. If cache memory 155 is not coherent with memory device 170, memory controller 160 will rely on the memory request to be processed by memory device 170. In such a case, memory controller 160 passes data returned by memory device 170 to bus controller 130, and the data is then provided to device 110. Alternatively, if cache memory 155 is coherent, bus interface unit 140 passes the data returned by cache memory 155 to bus controller 130, and bus controller 130 passes the data to device 110, over PCI bus 120.

Bus controller does not wait for a response from memory controller 160 before issuing a new request, when data is provided from cache memory 155. If cache memory 155 processes the memory request, memory controller 160 must make sure no data is returned back to bus controller 130 in response to the same request. If data associated with a first request is returned to bus controller 130 after a new memory request has been generated, the data associated with the first request could contaminate data associated with the new memory request. To prevent this, memory controller 160 ensures that any data from the memory device 170 is not returned to bus controller 130, after bus controller 130 has received data from cache memory 155, through bus interface unit 140.

Bus interface 140 provides a notification to memory controller 160 that cache memory 155 is coherent, and being used to provide the requested data to bus controller 130. In one embodiment, the notification includes a kill signal to notify memory controller 160 to terminate the pending request for data from memory device 170, since the data has already been provided. In one embodiment, all the memory requests received by memory controller 160 are provided a unique identifier. The kill signal indicates which request is to be terminated. Memory controller 160 generates a new identifier associated with the indicated request and searches through the pending requests to determine which one to remove. In one embodiment, if the kill signal is provided before the identified request is sent to memory, the request is removed from a collection of pending requests tracked by memory controller 160. Alternatively, if the identified request has already been delivered to memory device 170, memory controller 160 discards the data returned from memory device 170 associated with the identified request. In one embodiment, memory controller 160 blocks a generation of output protocols used to provide the returned data to bus controller 130, as described further in reference to FIG. 4.

In conventional systems, bus controller 130 must wait for a response from memory controller 160 before submitting new requests to memory controller 160, regardless of whether or not the data was provided through bus interface unit 140. By terminating the identified request, memory controller 160 may ensure that bus controller 130 does not receive the data associated with the identified request. In system 100, bus controller 130 is free to submit new memory requests without having to receive a response from memory controller 160.

Figure 2:
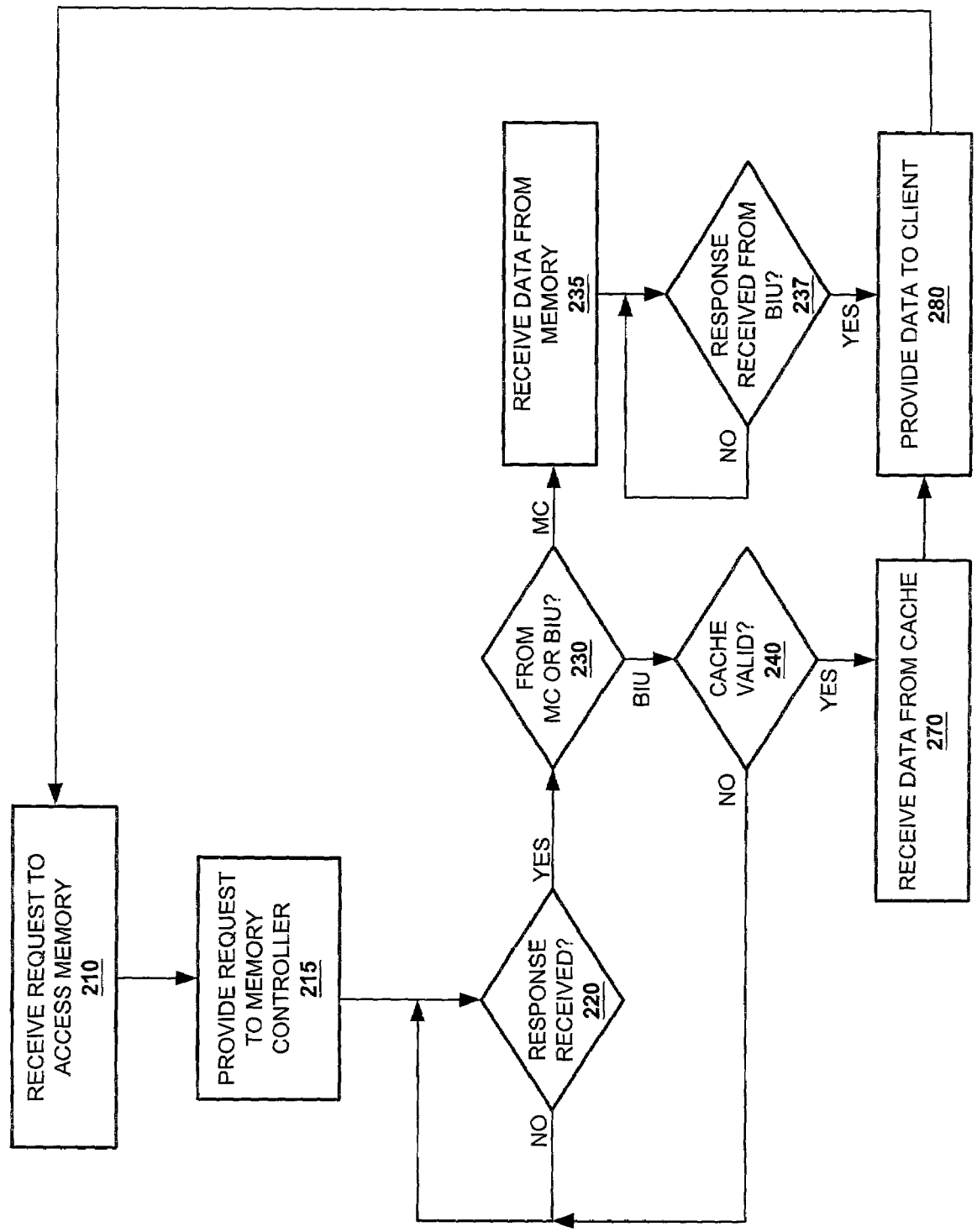
FIG. 2 is a flow diagram illustrating a method of handling memory requests from a bus client, according to one embodiment of the present invention.

Referring now to FIG. 2, a flow diagram illustrating a method of handling memory requests from a bus client is shown, according to one embodiment of the present invention. Memory read requests received by a PCI bus controller are routed to a memory controller for access to a main memory device, such as RAM memory. The PCI bus controller waits for data corresponding to the request to be returned before sending a new read request. The data may be returned from either the memory device or from a cache memory.

In step 210, the PCI controller receives a request to access memory. The request includes a read request directed to a portion of the memory device. The request is generated through a PCI bus client. In one embodiment, the PCI bus client includes a graphics client. In step 215, the request is sent to the memory controller. As previously discussed, the memory controller provides access to the memory device, such as system memory or video memory. Due to commands by the PCI bus client, the memory controller may become overwhelmed with memory requests to be processed. Handling all the memory requests from the PCI bus client may hinder an ability of the memory controller to handle other memory requests. To reduce the number of commands that must be processed by the memory controller, the memory controller provides the memory request to a bus interface unit.

The bus interface unit determines if the request can be handled through cache memory. Cache memory may include a copy of the data from the memory device. However, the cache memory may not be valid, such as in the case in which cache memory has not been updated since the last write command to the memory device. The host bus interface must determine the validity, or coherence, of cache memory. While the request has been sent to the bus interface unit, the memory controller continues to process the request to the memory device. If the cache memory is not valid, the PCI bus controller relies on the memory controller to provide the data from the memory device.

In step 220, the PCI bus controller waits for a response in relation to the sent read request before submitting a new memory read request. When a response is received, the PCI bus controller transitions to step 230, where the PCI bus controller determines where the response came from. Since the response is being processed in both the memory controller and the bus interface unit, the response may come from either the memory controller or the bus interface unit. In step 230, if the response came from the memory controller, the PCI bus controller transitions to step 235 where the PCI bus controller receives the data associated with the sent memory request from the memory device. In step 237, once the data has been received, the PCI bus controller determines whether a response has been received from the bus interface unit. In one embodiment, to insure that a response from the bus interface unit is not confused with a response to a future memory request, the PCI bus controller waits for the response from the bus interface. In one embodiment, if the bus interface unit returns data, the PCI bus discards the data since it has already received the data from the memory controller. In step 280, the received data is provided to the requesting client.

If the response in step 230 was from the bus interface unit, the PCI bus controller determines the nature of the response. In step 240, if the response indicates that the cache memory is not valid, indicating the data in cache memory is not current with the data in the memory device, the PCI bus controller returns to step 220, to wait for a response from the memory controller. However, if the response received from the bus interface unit indicates the cache memory is valid, the PCI bus controller receives the data requested from the cache memory in step 270. During step 270, the bus interface unit also delivers a signal notifying the memory controller of the valid data in cache memory. The memory controller terminates the memory request being processed through the memory controller. The request may be terminated before it is sent to the memory device, reducing data bandwidth to the memory device. Alternatively, the memory controller may discard the data returned from the memory device associated with the request, ensuring that data from the memory device does not reach the PCI bus controller.

By terminating the memory request or data associated with the memory request in the memory controller, the PCI bus controller does not have to wait to receive a response from the memory controller before submitting a new memory read request. In step 280, the received data is provided to the requesting client. Once the data is submitted to the client, the PCI bus controller may continue to receive and process new memory read requests.

Figure 3:
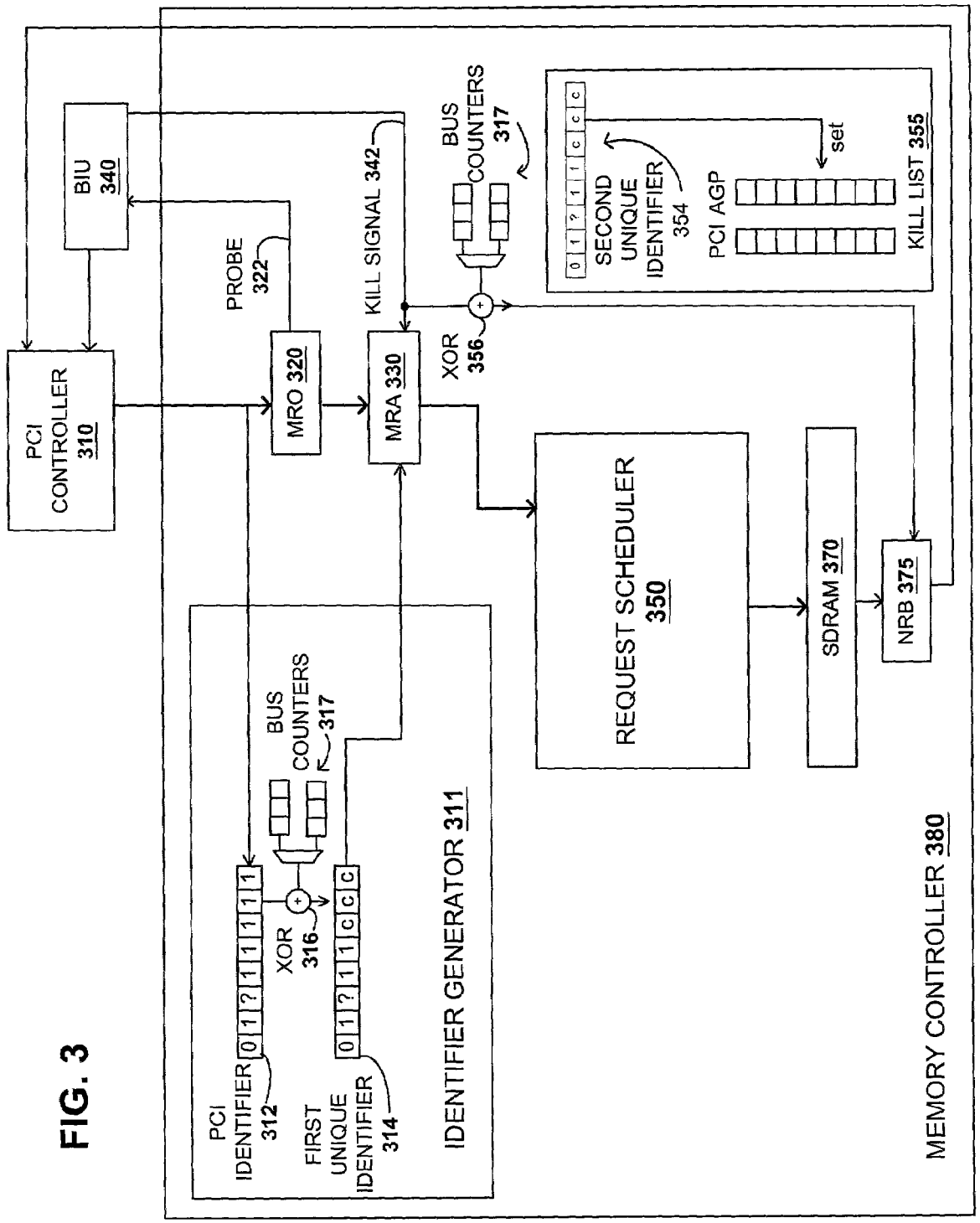
FIG. 3 is a block diagram illustrating components of a memory controller for processing and terminating memory requests, according to one embodiment of the present invention.

Referring now to FIG. 3, a block diagram illustrating components of a memory controller for processing and terminating memory requests from a bus controller is shown, according to one embodiment of the present invention. A memory controller 380 handles memory requests from a PCI controller 310. Memory controller 380 processes the memory requests and provides read memory requests to bus interface unit 340. Bus interface unit 340 attempts to process the read memory requests using cache memory (not shown) of a processor (not shown), simultaneous with memory controller 380 attempting to process the memory requests using a main memory device, such as synchronous dynamic random access memory (SDRAM) 370.

PCI controller 310 receives memory requests from clients connected through a system bus, such as a PCI bus. The clients may include hardware systems, such as graphics hardware, which generate memory requests to read data and write data in SDRAM 370. In one embodiment, PCI controller 310 receives a memory read request from one of the clients. PCI controller 310 provides the memory request to memory controller 380. Memory controller 380 generates a unique identifier, first unique identifier 314 to track the memory request. Identifier generator 311 includes a collection of components to generate the identifier. In one embodiment, an identifier provided by the PCI controller 310, PCI identifier 312, is converted into first unique identifier 314. PCI identifier 312 may include three bits to identify a port of memory controller 380 and five bits to identify a type of memory transaction or memory request being performed.

In one embodiment, an exclusive-or operator 316 is used to combine the values of the bits in PCI identifier 312 with the values of bus counters 317. Bus counters 317 include a first counter to track a number of requests originating from clients over the PCI bus and a second counter to track the number of requests originating from clients over an advanced graphics port (AGP, not shown). The result of the exclusive or operation is an eight-bit identifier, first unique identifier 314. Identifier generator 311 should be capable of providing an identifier to uniquely track the memory request among other requests in memory controller 380, for the duration the memory request is pending in memory controller 380. It should be appreciated that other methods of providing a unique identifier may be used without departing from the scope of the present invention.

A memory request organizer (MRO) 320 within memory controller 380 receives and performs initial operations on the memory request. In one embodiment, MRO 320 is responsible for scheduling read and write requests to SDRAM 370. The read and write requests may come from the bus interface unit 340, PCI controller 310, an AGP port, or any additional system buses and/or clients. MRO 320 evaluates any dependencies a particular read or write memory request may have. For example, a particular read request may necessarily follow a particular write request. The write request would have to be processed before the read request. MRO 320 waits for any dependencies to be resolved, and routes data and memory requests accordingly. In one embodiment, the MRO 320 sends a probe signal 322 to bus interface unit 340. Probe signal 322 includes the memory request provided through PCI controller 310.

Bus interface unit 340 receives probe signal 322 and determines if a cache memory associated with bus interface unit 340 is capable of providing the data to satisfy the memory request. The cache memory includes a copy of the data in SDRAM 370. The cache memory is occasionally synchronized, or updated, to match SDRAM 370. If no other processor, such as in a multi-processor system, or system component or device, such as through PCI controller 310 has written to SDRAM 370 since the cache memory was updated, the cache memory may be considered valid. If the cache memory is valid, the bus interface unit 340 provides the requested data from the memory read request to PCI controller 310. The bus interface unit also provides a kill signal 342 to memory controller 380. Kill signal 342 is used to notify memory controller 311 of the request which bus interface unit 340 has handled, allowing memory controller 380 to identify and terminate the particular memory request.

While the bus interface unit 340 validates cache memory and processes the memory request, the memory controller 380 continues to process the memory request. A memory request arbiter (MRA) 330 receives the requests in an order generated through MRO 320. MRA 330 arbitrates received requests among the different memory requesters, such as different PCI clients, AGP clients, bus interface unit 340, or memory controller 380. In one embodiment, MRA 330 selects requests from each of the requesters in a round robin manner, selecting one request from each in a defined order. MRA 330 may also perform translations from a physical address provided by PCI controller 310 to a bank, row, and column address specific to SDRAM 370.

If MRA 330 receives kill signal 342 before MRA 330 has passed the particular memory request, specified by kill signal 342, MRA 330 discards the particular memory request. In one embodiment, a second unique identifier 354 is generated from the request identified kill signal 342. Second unique identifier 354 should be generated in a manner similar to first unique identifier 314. A second exclusive-or operator 356 is used to generate second unique identifier 354 from an identifier of kill signal 342 and bus counters 317. For the same memory request, first unique identifier 314 should match second unique identifier 354.

In one embodiment, unique identifier 354 is used to set a memory request to be terminated, as part of a kill list 355. In one embodiment, three bits of the second unique identifier 354, as determined through bus counters 317, are used to mark one of eight possible memory requests for termination in kill list 355. In one embodiment, MRA 330 attempts to match first unique identifier 314 of a received memory request to second unique identifier 354. If a match is detected, MRA 330 discards the memory request. Alternatively, if the memory request has already passed through MRA 330 before the receipt of kill signal 342 or the first and second unique identifiers 314 and 354 do not match, the memory request is received by request scheduler 350.

Request scheduler 350 stores memory requests received from MRA 330. In one embodiment, the memory requests are placed on a queue for output to main memory, such as SDRAM 370. Memory requests may simply be placed on the queue in a first-in-first-out configuration, wherein a newly received memory request is placed on top of the latest memory request in the queue. In one embodiment, page hit requests form an exception, in which page hit requests are placed ahead of any page-miss requests, but behind older page-hit requests. In one embodiment, memory requests stored by request scheduler 350 include an address of SDRAM 370 to access, a data size requested, and any other information, such as dependency flags used to mark unresolved dependency issues. The memory requests that are at the bottom of the queue in request scheduler 350 are passed to SDRAM 370 for processing. It should be noted that request scheduler 350 is only capable of processing a particular number of requests for SDRAM 370 in a particular amount of time. If a memory request is terminated by kill signal 342 prior to entry in request scheduler 350, the termination frees up space in the queue of request scheduler 350, allowing it to handle another memory request in place of the terminated memory request.

Memory requests from request scheduler 350 are received and processed through SDRAM 370. SDRAM 370 stores any data associated with write requests and returns data associated with read requests. A north-bridge read buffer (NRB) 375 receives and processes the returned data. NRB 375 is responsible for generating protocol to provide the returned data to a requesting client, such as a PCI client coupled through PCI controller 310. In one embodiment, NRB 375 attempts to match the first unique identifier 314 associated with returned data from SDRAM 370 to a second unique identifier 354 from kill list 355. If a match is found, NRB 375 insures that no protocols are generated from the particular returned data. In one embodiment, NRB 375 disables any protocol output for a number of data bits specified through a data size associated with the particular returned data. In another embodiment, generated protocols being output are combined with bits of an output mask. To cancel an output of generated protocols, the mask is zeroed out, forcing the output bits to zeroes. Alternatively, if no match was found, the protocol for the returned data is allowed to be output to PCI controller 310 for passage back to a requesting PCI client. It should be appreciated that other forms of RAM may be used in place of SDRAM 370, such as other forms of static RAM, or dynamic RAM, as well as volatile, or non-volatile memory. In one embodiment SDRAM 370 includes video memory used for processing requests associated with a graphics processor. Furthermore, memory requests from other system components or system busses may be handled through memory controller 380 and bus interface unit 340, in place of or in addition to PCI controller 310. It should be noted that other methods may be employed to effectively discard returned data without departing from the scope of the present invention.

Figure 4:
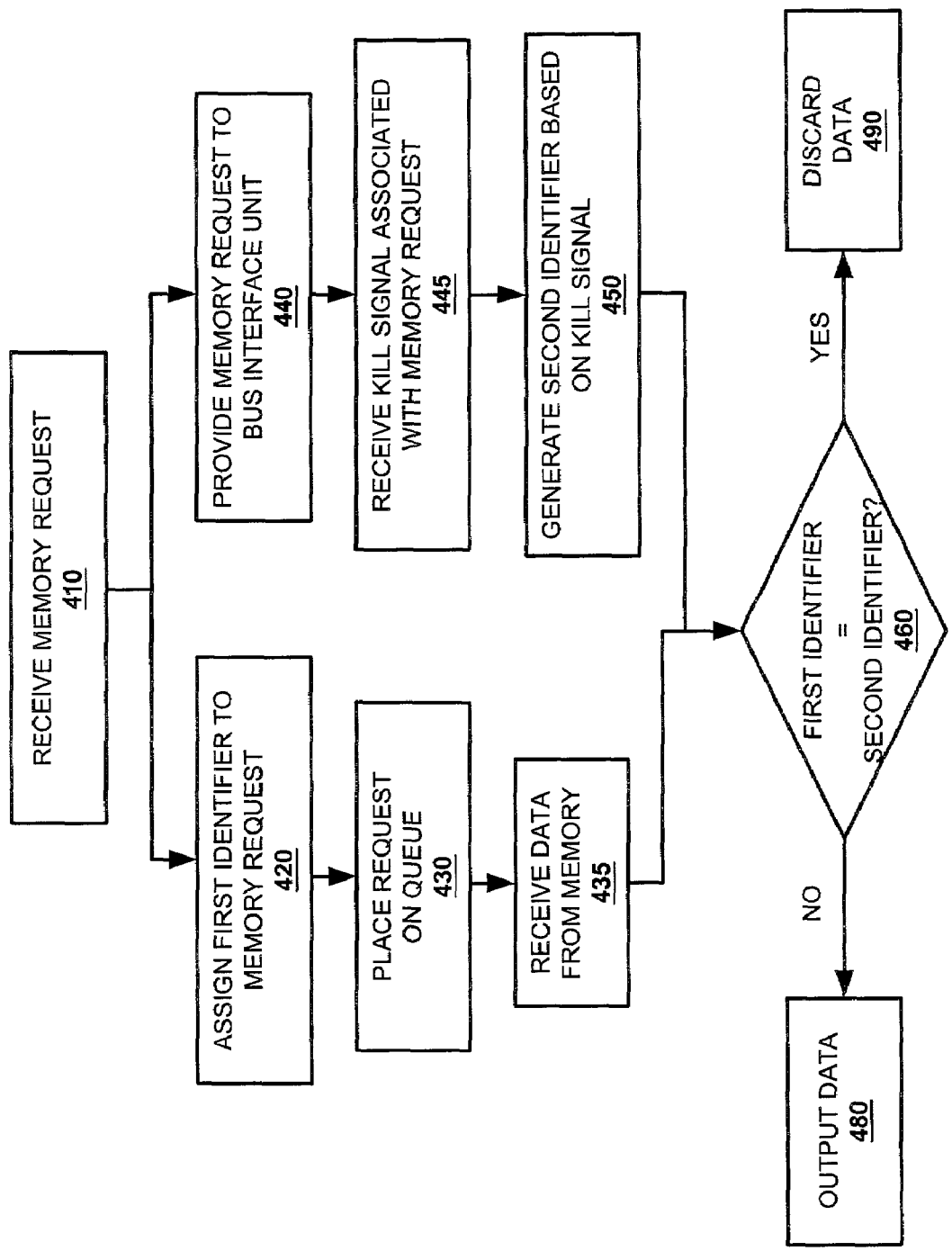
FIG. 4 is a flow diagram illustrating a method of processing and terminating memory requests from a bus controller, according to one embodiment of the present invention.

Referring now to FIG. 4, a flow diagram illustrating a method of processing and terminating memory requests from a bus controller is shown, according to one embodiment of the present invention. A memory controller is used to process a memory read request generated by a PCI bus client. To reduce the number of memory requests sent to a memory device, the memory controller provides the request to a bus interface unit, allowing the bus interface unit to process the request using cache memory of a microprocessor, such as a CPU. However, since the cache memory may not be valid, the memory controller continues to process the request for data from the memory device. If cache memory does process the request, the memory controller discards any data generated by the request to the memory device to ensure no response is provided to the PCI bus client from the memory controller.

In step 410, the memory controller receives the memory request. As previously discussed, the memory request originates from a PCI bus client. In one embodiment, the PCI bus client is a graphics client. The request is initially received by a PCI bus controller, which generates appropriate protocol to provide the memory request to the memory controller. In one embodiment, the PCI bus controller generates commands to assign the memory request to a particular port of the memory controller. The memory controller receives the request and begins to prepare the request for processing in the memory device.

In step 420 the memory controller assigns a first identifier to the memory request. The identifier is to allow the memory controller to track the memory request and any returned data associated with the request. Since the memory controller may be processing other memory requests, the identifier should be unique to the particular memory request for the duration of the memory request and the duration of any data associated with the memory request. In one embodiment, an identifier associated with the memory request, generated by the PCI controller, is exclusive-or'ed with values from counters used to track a number of system bus requests to generate a unique identifier.

In step 430, the memory controller places the memory request on a queue. The queue is used to store the memory request until memory device is ready to process the memory request. In one embodiment, all received memory requests are organized and arbitrated to identify any priorities or dependencies that govern the memory requests. Accordingly, the memory controller would assign placements for individual memory requests on the queue. In step 435, after memory device has read the memory request from the queue, the memory controller receives data in response to the memory request.

In step 440, the memory controller provides the memory request to a bus interface unit. The bus interface unit is coupled to a processor and cache memory. The host bus interface unit is provided the memory request to attempt to retrieve any requested data from cache memory. The bus interface unit is allowed to process the memory request simultaneously with the processing performed by the memory controller in steps 420–435. If the cache memory is valid, the bus interface unit provides the data to the requesting client, through the PCI bus controller. The bus interface unit also provides a kill signal to the memory controller, indicating it is providing the data associated with the memory request.

In step 445, the memory controller receives the kill signal generated by the bus interface unit. The kill signal identifies the memory request being processed using cache memory. To ensure the requesting client does not receive two sets of data, the memory controller must discard the memory request it is currently processing, or any data associated with the memory request. In step 450, the memory controller generates a second identifier. The second identifier is based on a memory request identified by the kill signal, allowing the memory controller to uniquely identify the memory request to be discarded. The second identifier should be generated using the same procedure as used in generating the first identifier. If generated from the same memory request, the first and second identifiers should be the same.

In step 460, the first identifier is compared to the second identifier. If the memory request associated with the first identifier has already been processed by the memory device, the first identifier is associated with the data returned by the memory device. If the first identifier does not match the second identifier, the data is output to the PCI controller, where it can be routed to the requesting client, as in step 480. In one output, protocols are generated to allow the output data to be properly assigned to the requesting client. If the first and second identifiers match in step 460, the memory controller transitions to step 490. In step 490, the data is discarded. In one embodiment, an output module, such as NRB 375 (FIG. 3), blocks the output or generation of any protocols used to send the data for a number of data bits specified by the size of the data.

In one embodiment, the second identifier is used to select a value from a kill list. The kill list is used to identify memory requests to be terminated. Identifiers of subsequent memory requests or data from the memory requests are each compared to the kill list to determine if any of them should be terminated. It should be appreciated that other methods of identifying the memory requests to be terminated may be performed without departing from the scope of the present invention. In one embodiment, memory requests are terminated prior to being placed on the queue (step 430). In one embodiment, the point of terminating the memory request is dependent on the delay involved between providing the memory request to the bus interface unit (step 440) and receiving the kill signal from the bus interface unit (step 445).

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that the system described herein has the advantage of providing improved performance in handling memory requests.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A system comprising:
   a data processor having:
      an input/output buffer; and
      cache memory to store data associated with a memory device;
   a bus interface unit having a first input/output buffer coupled to the input/output buffer of the data processor, a second input/output buffer and a third input/output buffer, said bus interface unit to:
      determine a validity of data in said cache memory during a cache access; and
      provide a notification indicating data in said cache memory is valid, wherein said notification identifies a first request;
   said memory device having an input/output buffer coupled, to said memory device to provide data associated with a first request;
   a bus controller having a first input/output buffer coupled to the input/output buffer of the data processor, a second input/output buffer coupled to the second input/output buffer of the bus interface unit and a third input/output buffer, said bus controller to:
      receive said first request to access data in said memory device, wherein said first request is received from a bus client;
      provide said first request to the memory controller;
      receive said data associated with said first request from said bus interface unit;
   the memory controller having a first input/output buffer coupled to the third input/output buffer of the bus controller, a second input/output buffer coupled to the third input/output buffer of the bus interface unit and a third input/output buffer coupled to the input/output buffer of the memory device, said memory controller to:
      provide access to said memory device;
      receive said first request from said bus controller;
      prepare said first request to access data from said memory device;
      provide a second request to said bus interface unit, wherein said second request is to access data associated with said first request from said cache memory;
      receive said notification from said bus interface unit;
      generate a second identifier using said notification;
      store said second identifier as part of a kill list, wherein said kill list identifies requests to be terminated: and
      terminate the first request based on the kill list.

2. The system as in claim 1, wherein said bus interface unit is further used to synchronize said cache memory to said memory device.

3. The system as in claim 2, wherein said bus interface unit is further used to determine a coherency between said cache memory and said memory device.

4. The system as in claim 3, wherein the coherency is dependent on whether said memory device has been written to prior to a synchronization of said cache memory with said memory device.

5. The system as in claim 1, wherein said bus controller includes a peripheral component interconnect bus controller.

6. The system as in claim 1, wherein said memory device includes random access memory.

7. The system as in claim 1, wherein said memory controller is further used to:
   assign a first identifier to said first request; and
   identify said first request from a plurality of pending requests using said first identifier.

8. The system as in claim 1, wherein said memory controller to terminate the first request is further to discard data received from said memory device, wherein said data is associated with said first request.

* * * * *